US012586952B2

United States Patent

(12) United States Patent
Huang

(10) Patent No.: US 12,586,952 B2
(45) Date of Patent: Mar. 24, 2026

(54) CONNECTING ASSEMBLY AND RELATED ELECTRONIC APPARATUS

(71) Applicant: Moxa Inc., New Taipei City (TW)

(72) Inventor: Yi-Chun Huang, New Taipei City (TW)

(73) Assignee: Moxa Inc., New Taipei City (TW)

( * ) Notice: Subject to any disclaimer, the term of this patent is extended or adjusted under 35 U.S.C. 154(b) by 376 days.

(21) Appl. No.: 18/523,889

(22) Filed: Nov. 30, 2023

(65) Prior Publication Data

US 2025/0087937 A1 Mar. 13, 2025

(30) Foreign Application Priority Data

Sep. 8, 2023 (TW) ................................ 112134186

(51) Int. Cl.

| | |
|---|---|
| ***H01R 13/62*** | (2006.01) |
| ***H01R 13/52*** | (2006.01) |
| ***H01R 13/621*** | (2006.01) |
| ***H01R 13/631*** | (2006.01) |

(52) U.S. Cl.

CPC ..... *H01R 13/6215* (2013.01); *H01R 13/5219* (2013.01); *H01R 13/631* (2013.01)

(58) Field of Classification Search

CPC ............ H01R 13/6215; H01R 13/5219; H01R 13/631; H05K 5/30; H05K 5/0221; H05K 5/0217; H05K 5/0247; H05K 5/069

See application file for complete search history.

(56) References Cited

U.S. PATENT DOCUMENTS 4,158,152 A * 6/1979 Puhak ........................ H01J 5/48 439/150
4,558,914 A * 12/1985 Prager .................. H05K 7/1465 439/294
4,597,631 A * 7/1986 Flores .................. G02B 6/3897 385/59

(Continued)

FOREIGN PATENT DOCUMENTS

CN 107092305 A 8/2017
CN 112750372 A 5/2021

(Continued)

*Primary Examiner* — Truc T Nguyen
(74) *Attorney, Agent, or Firm* — Winston Hsu

(57) ABSTRACT

A connecting assembly for aligning and connecting a first electronic device and a second electronic device is provided. The connecting assembly includes a first connecting component, a second connecting component, a pin, a resilient component and a locking component. The first connecting component is disposed on the first electronic device. The second connecting component is disposed on the second electronic device. The pin protrudes from the first connecting component and is configured to be inserted into the second connecting component along a first direction. The resilient component is disposed inside the second connecting component and configured to apply a radial resilient force onto the pin inserted into the second connecting component. The locking component is screwed onto the second connecting component and configured to apply a radial locking force onto the pin inserted into the second connecting component. Besides, a related electronic apparatus is also provided.

20 Claims, 15 Drawing Sheets

(56) References Cited

U.S. PATENT DOCUMENTS

| | | | | | |
|---|---|---|---|---|---|
| 4,790,762 | A * | 12/1988 | Harms | H05K 7/1478 | 439/62 |
| 5,226,823 | A * | 7/1993 | Johnson | H05K 7/023 | 439/71 |
| 5,588,862 | A * | 12/1996 | Perkins | H01R 13/6278 | 439/346 |
| 5,677,830 | A * | 10/1997 | Nogas | H05K 7/1435 | 361/732 |
| 5,788,347 | A * | 8/1998 | Rabinovitz | H05K 5/30 | 439/701 |
| 6,582,246 | B1 * | 6/2003 | Rensi | H01R 13/5213 | 439/377 |
| 8,025,534 | B2 * | 9/2011 | Bates | G06F 13/409 | 439/638 |
| 8,360,796 | B2 * | 1/2013 | Daubigney | H01R 13/639 | 439/378 |
| 2003/0082955 | A1 * | 5/2003 | Zaderej | H05K 5/30 | 439/701 |
| 2005/0148241 | A1 * | 7/2005 | Kohen | F21V 23/06 | 439/441 |
| 2009/0141458 | A1 | 6/2009 | Liu | | |
| 2013/0303004 | A1 * | 11/2013 | Daughtry, Jr. | H01R 12/7076 | 439/83 |
| 2014/0127926 | A1 * | 5/2014 | Condo | H01R 13/6456 | 439/345 |
| 2014/0162487 | A1 * | 6/2014 | Frederick | H01R 13/629 | 439/370 |
| 2014/0355937 | A1 * | 12/2014 | Simpson | H04Q 1/08 | 439/247 |
| 2014/0364008 | A1 * | 12/2014 | Simmel | H01R 13/514 | 439/607.23 |
| 2016/0134035 | A1 * | 5/2016 | Hewer | H01R 12/7005 | 439/660 |
| 2017/0105293 | A1 | 4/2017 | Kim | | |
| 2019/0151959 | A1 | 5/2019 | Ho | | |
| 2020/0196466 | A1 | 6/2020 | Fischl | | |
| 2021/0164610 | A1 * | 6/2021 | Roth | F16M 11/04 | |
| 2022/0326731 | A1 | 10/2022 | Degner | | |

FOREIGN PATENT DOCUMENTS

| | | | |
|---|---|---|---|
| CN | 115497385 | A | 12/2022 |
| CN | 218347705 | U | 1/2023 |
| EP | 2 819 494 | A1 | 12/2014 |
| JP | 2000-252638 | A | 9/2000 |
| JP | 2003-348715 | A | 12/2003 |
| JP | 2005-116872 | A | 4/2005 |
| TW | 201814235 | A | 4/2018 |
| TW | 201924825 | A | 7/2019 |

* cited by examiner

CONNECTING ASSEMBLY AND RELATED ELECTRONIC APPARATUS

BACKGROUND OF THE INVENTION

1. Field of the Invention

The present invention relates to a connecting assembly and an electronic apparatus having the aforementioned connecting assembly, and more specifically, to a connecting assembly for aligning and connecting two electronic devices, and an electronic apparatus having the aforementioned connecting assembly.

2. Description of the Prior Art

In order to satisfy different requirements in different application fields, modularity has gradually become a mainstream trend of electronic apparatuses. A modular electronic apparatus usually includes a plurality of detachable electronic devices. For example, the detachable device can be a power supply device, a switch or a processing device. Therefore, it has become an important topic to enable two detachable devices to be aligned and connected to each other stably and firmly.

SUMMARY OF THE INVENTION

It is an objective of the present invention to provide a connecting assembly for aligning and connecting two electronic devices, and an electronic apparatus having the aforementioned connecting assembly.

In order to achieve the aforementioned objective, the present invention discloses a connecting assembly for aligning and connecting a first electronic device and a second electronic device. The connecting assembly includes a first connecting component, a second connecting component, a pin, a resilient component and a locking component. The first connecting component is disposed on the first electronic device. The second connecting component is disposed on the second electronic device. The pin protrudes from the first connecting component and is configured to be inserted into the second connecting component along a first direction. The resilient component is disposed inside the second connecting component and configured to apply a radial resilient force onto the pin inserted into the second connecting component. The locking component is screwed onto the second connecting component and configured to apply a radial locking force onto the pin inserted into the second connecting component.

According to an embodiment of the present invention, the connecting assembly further includes an abutting component disposed inside the second connecting component and configured to abut against the pin, and the resilient component abuts against the abutting component to indirectly apply the radial resilient force onto the pin via the abutting component.

According to an embodiment of the present invention, a groove is formed on the pin and configured to cooperate with the abutting component and the locking component, and the groove is formed on an outer periphery of the pin along a circumferential direction.

According to an embodiment of the present invention, the connecting assembly further includes a sealing component disposed between the first connecting component and the second connecting component, and when the locking component is screwed onto the second connecting component, a cooperation of the locking component and the groove drives the pin to move from an initial inserting position to a predetermined inserting position along the first direction for driving the first connecting component to move along the first direction together with the pin, such that the sealing component is clamped and resiliently deformed by the first connecting component and the second connecting component.

According to an embodiment of the present invention, the abutting component is a ball-shaped structure or a protruding platform structure. The locking component is a screw or a bolt, and the resilient component is a compression spring.

According to an embodiment of the present invention, the resilient component abuts against the pin to directly apply the radial resilient force onto the pin.

According to an embodiment of the present invention, a first groove and a second groove are formed on the pin and configured to cooperate with the resilient component and the locking component, respectively.

According to an embodiment of the present invention, the connecting assembly further includes a sealing component disposed between the first connecting component and the second connecting component. When the locking component is screwed onto the second connecting component, a cooperation of the locking component and the second groove drives the pin to move from an initial inserting position to a predetermined inserting position along the first direction for driving the first connecting component to move along the first direction together with the pin, such that the sealing component is clamped and resiliently deformed by the first connecting component and the second connecting component.

According to an embodiment of the present invention, the resilient component is a U-shaped spring, and the locking component is a screw or a bolt.

According to an embodiment of the present invention, the connecting assembly further includes a sealing component disposed between the first connecting component and the second connecting component. When the locking component is screwed onto the second connecting component, a cooperation of the locking component and the pin driving the pin to move from an initial inserting position to a predetermined inserting position along the first direction for driving the first connecting component to move along the first direction together with the pin, such that the sealing component is clamped and resiliently deformed by the first connecting component and the second connecting component.

In order to achieve the aforementioned objective, the present invention further discloses an electronic apparatus. The electronic apparatus includes a first electronic device, a second electronic device and a connecting assembly. The second electronic device is detachably connected to the first electronic device. The connecting assembly is for aligning and connecting the first electronic device and the second electronic device. The connecting assembly includes a first connecting component, a second connecting component, a pin, a resilient component and a locking component. The first connecting component is disposed on the first electronic device. The second connecting component is disposed on the second electronic device. The pin protrudes from the first connecting component and is configured to be inserted into the second connecting component along a first direction. The resilient component is disposed inside the second connecting component and configured to apply a radial resilient force onto the pin inserted into the second connecting component. The locking component is screwed onto the second connecting component and configured to apply a radial locking force onto the pin inserted into the second connecting component.

In summary, the present invention can lock the pin with the radial resilient force generated by the resilient component and the radial locking force generated by the locking component for ensuring the first electronic device and the second electronic device to be aligned and connected to each other stably and firmly when the pin is inserted into the second connecting component and the locking component is screwed onto the second connecting component. Therefore, the present invention has advantages of simple structure and easy operation.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct electrical/mechanical connection. Thus, if a first device is connected to a second device, that connection may be through a direct electrical/mechanical connection, or through an indirect electrical/mechanical connection via other devices and connections.

Figure 1:
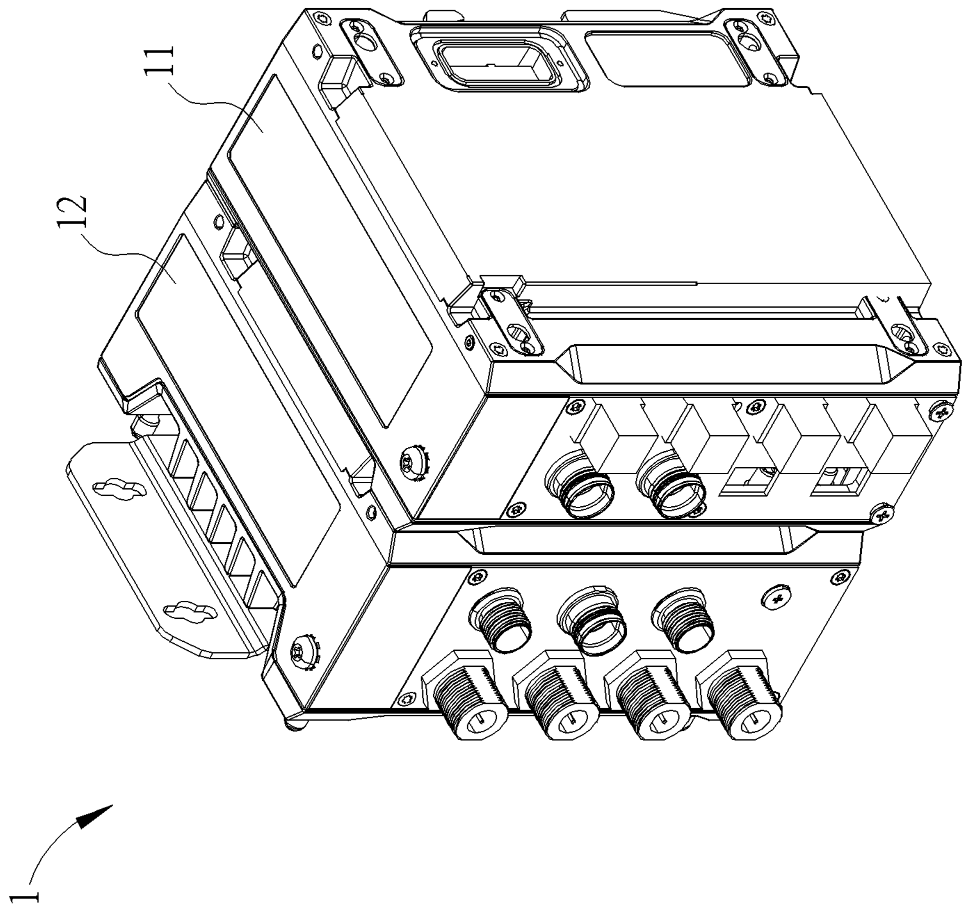
FIG. 1 is a diagram of an electronic apparatus according to a first embodiment of the present invention.
Figure 2:
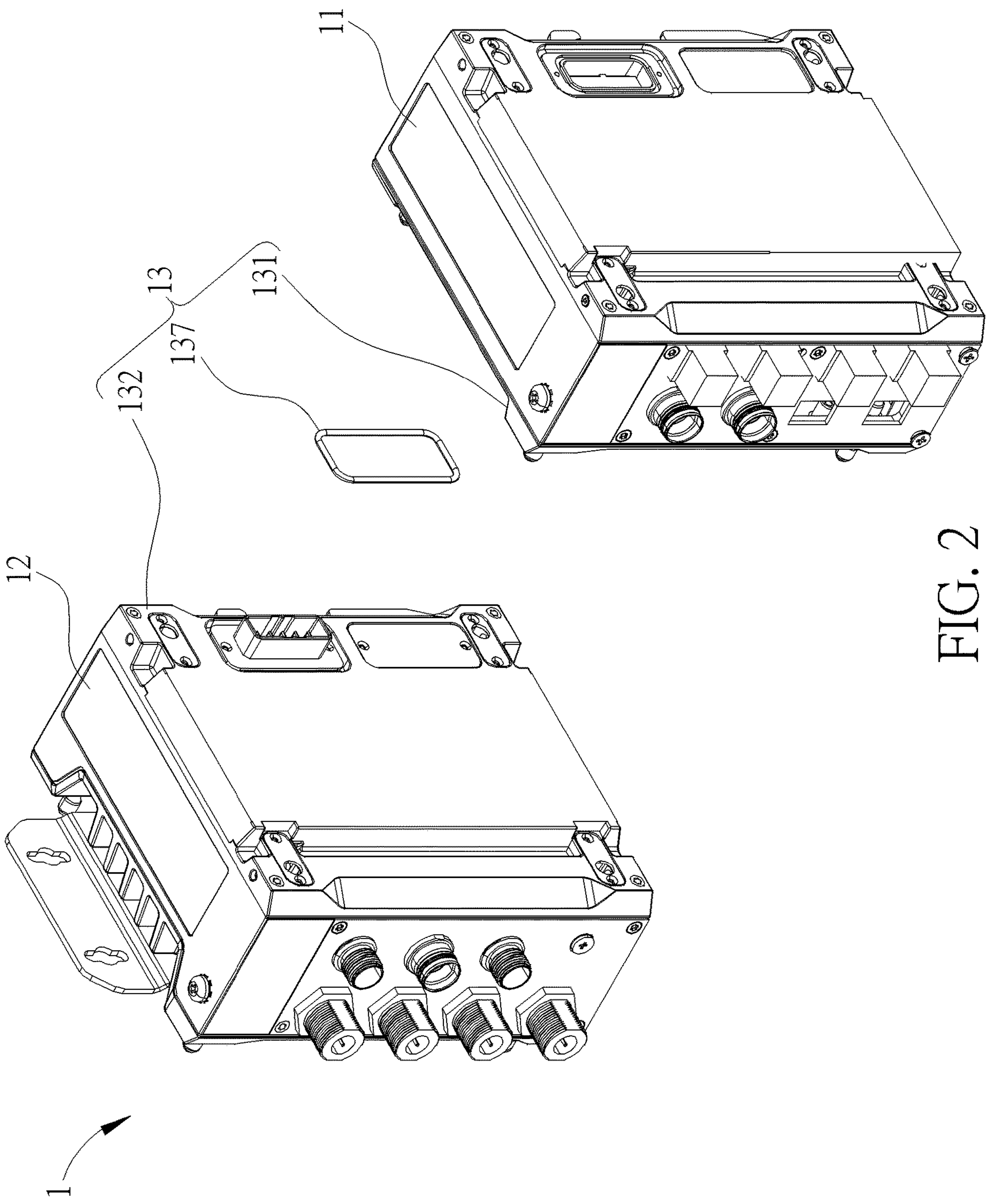
FIG. 2 and FIG. 3 are exploded diagrams of the electronic apparatus at different views according to the first embodiment of the present invention.
Figure 3:
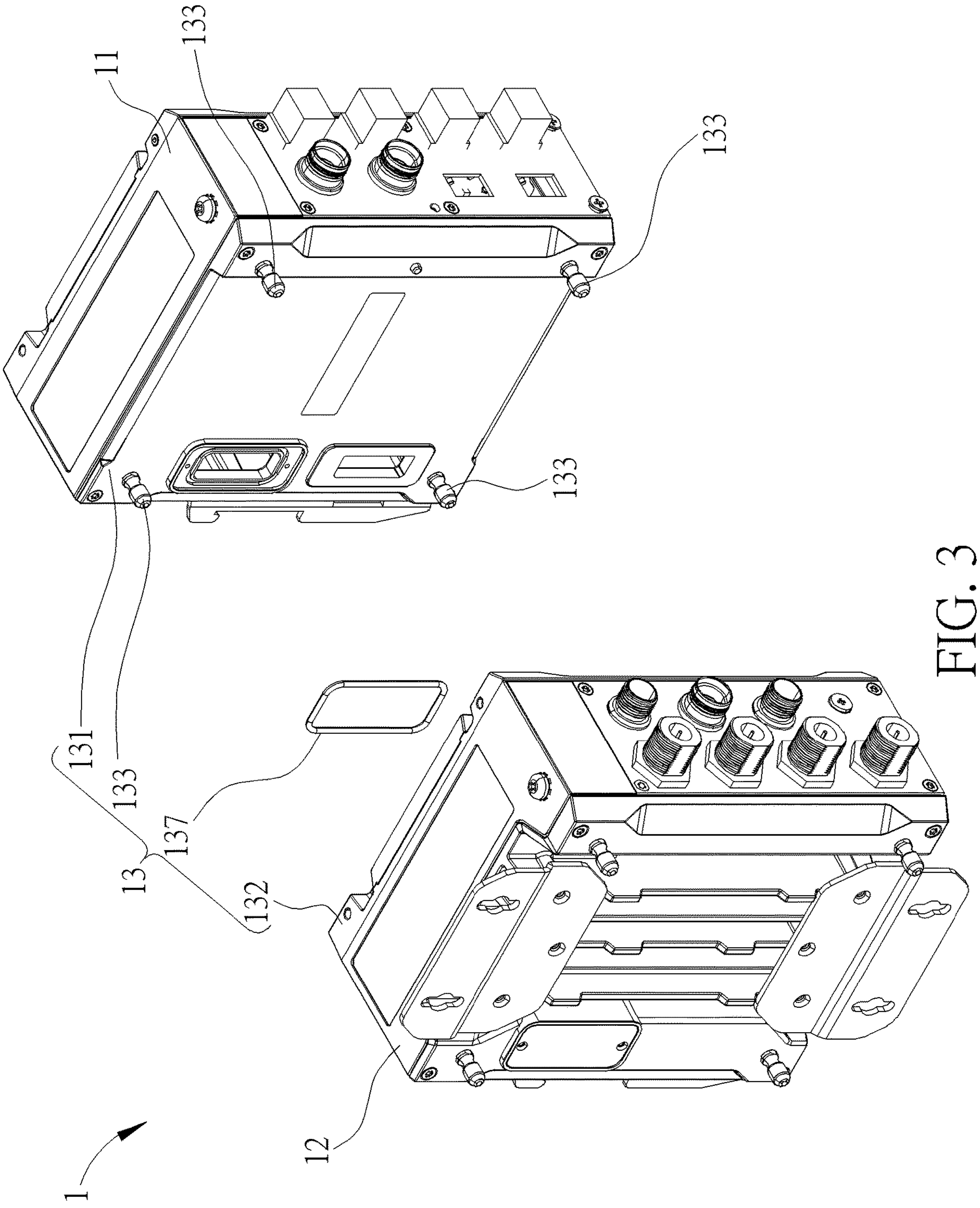
Figure 4:
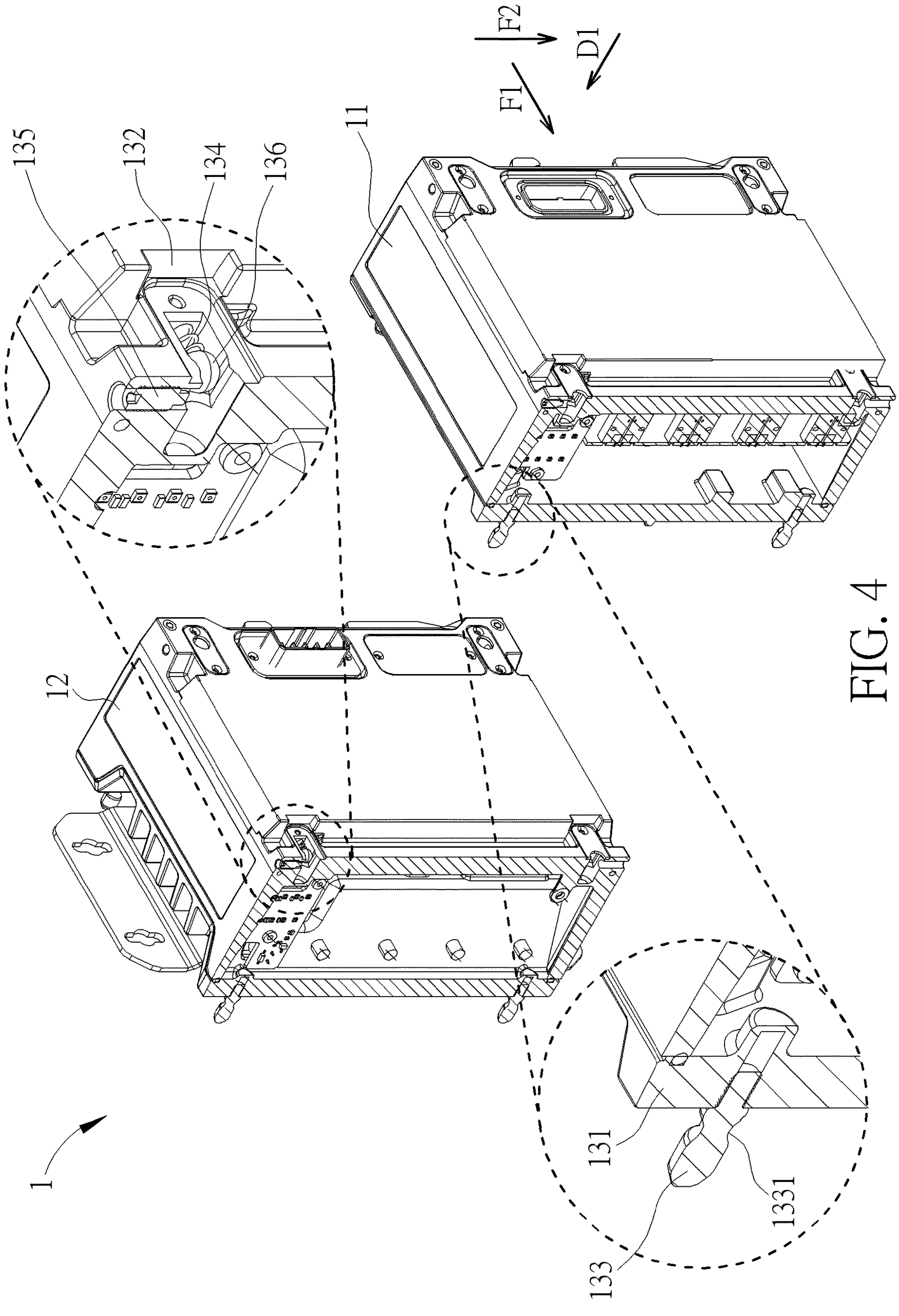
FIG. 4 is a partial sectional diagram of the electronic apparatus according to the first embodiment of the present invention.

Please refer to FIG. 1 to FIG. 4. FIG. 1 is a diagram of an electronic apparatus 1 according to a first embodiment of the present invention. FIG. 2 and FIG. 3 are exploded diagrams of the electronic apparatus 1 at different views according to the first embodiment of the present invention. FIG. 4 is a partial sectional diagram of the electronic apparatus 1 according to the first embodiment of the present invention. As shown in FIG. 1 to FIG. 4, the electronic apparatus 1 includes a first electronic device 11 and a second electronic device 12. The second electronic device 12 is detachably connected to the first electronic device 11. In this embodiment, the electronic apparatus 1 can be a remote terminal unit (RTU). The first electronic device 11 can be a signal switch. The second electronic device 12 can be a radio frequency (RF) communication device. However, the present invention is not limited to this embodiment.

As shown in FIG. 2 to FIG. 4, the electronic apparatus 1 further includes a connecting assembly 13 for aligning and connecting the first electronic device 11 and the second electronic device 12 stably and firmly. The connecting assembly 13 includes a first connecting component 131, a second connecting component 132, four pins 133, four resilient components 134 and four locking components 135. The first connecting component 131 is disposed on the first electronic device 11. The second connecting component 132 is disposed on the second electronic device 12. Each of the pins 133 protrudes from the first connecting component 131 and configured to be inserted into the second connecting component 132 along a first direction D1. Preferably, the four pins 133 are located adjacent to four corners of the first connecting component 131, respectively. Each of the resilient components 134 is disposed inside the second connecting component 132 and configured to apply a radial resilient force onto the corresponding pin 133 inserted into the second connecting component 132. Each of the locking components 135 is screwed onto the second connecting component 132 and configured to apply a radial locking force onto the corresponding pin 133 inserted into the second connecting component 132. For example, as shown in FIG. 4, the resilient component 134 is configured to apply the radial resilient force onto the corresponding pin 133 inserted into the second connecting component 132 along a first forcing direction F1, and the locking components 135 is configured to apply the radial locking force onto the corresponding pin 133 inserted into the second connecting component 132 along a second forcing direction F2, wherein the first forcing direction F1 and the second forcing direction F2 can be substantially perpendicular to each other and substantially perpendicular to the first direction D1.

In this embodiment, as shown in FIG. 2 and FIG. 3, the first connecting component 131 can be integrally connected to a left cover body of the first electronic device 11, and the second connecting component 132 can be integrally connected to a right cover body of the second electronic device 12. However, the present invention is not limited to this embodiment. For example, in another embodiment, the first connecting component can be an independent component and detachably connected to the left cover body of the first electronic device, and the second connecting component can be an independent component and detachably connected to the right cover body of the second electronic device.

Besides, in this embodiment, the locking component 135 can be a screw or a bolt, and the resilient component 134 can be a compression spring. However, the present invention is not limited to this embodiment.

Understandably, the numbers of the pin, the resilient component and the locking component are not limited to this embodiment. For example, in another embodiment, the connecting assembly can only include one pin, one resilient component and one locking component.

As shown in FIG. 4, the connecting assembly 13 further includes four abutting components 136. Each of the abutting components 136 is disposed inside the second connecting component 132 and configured to abut against the corresponding pin 133. Each of the resilient components 134 is configured to abut against the corresponding abutting component 136 to indirectly apply the radial resilient force onto the corresponding pin 133 via the corresponding abutting component 136. Understandably, in another embodiment, the connecting assembly can include only one abutting component abutted between the pin and the resilient component. Alternatively, in another embodiment, the abutting component can be omitted, and the resilient component can be configured to abut against the pin component to directly apply the radial resilient force onto the pin.

In this embodiment, the abutting component 136 can be a ball-shaped structure made of metal material. However, the present invention is not limited to this embodiment.

Figure 5:
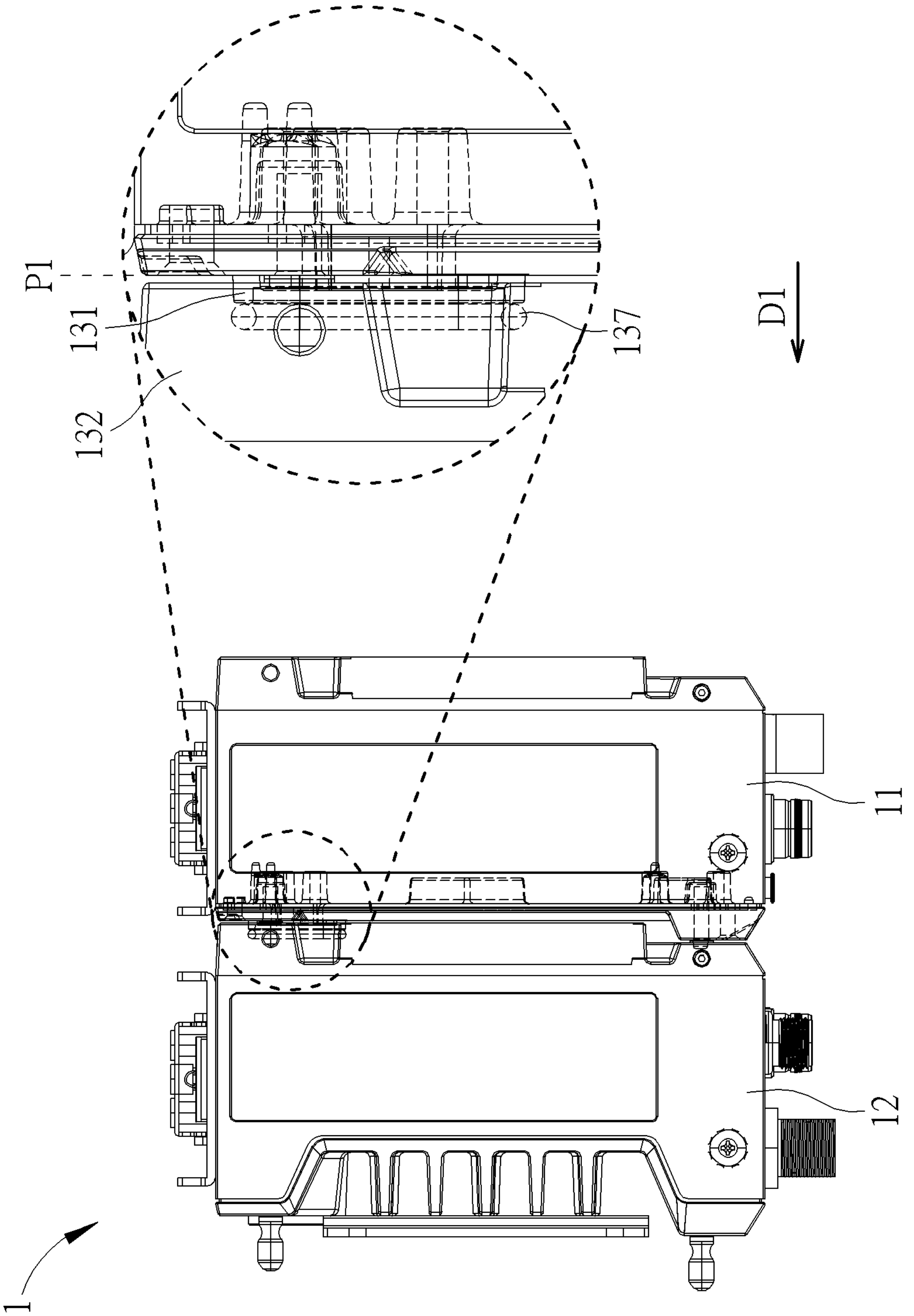
FIG. 5 is a partial diagram of the electronic apparatus in a non-locked state according to the first embodiment of the present invention.
Figure 6:
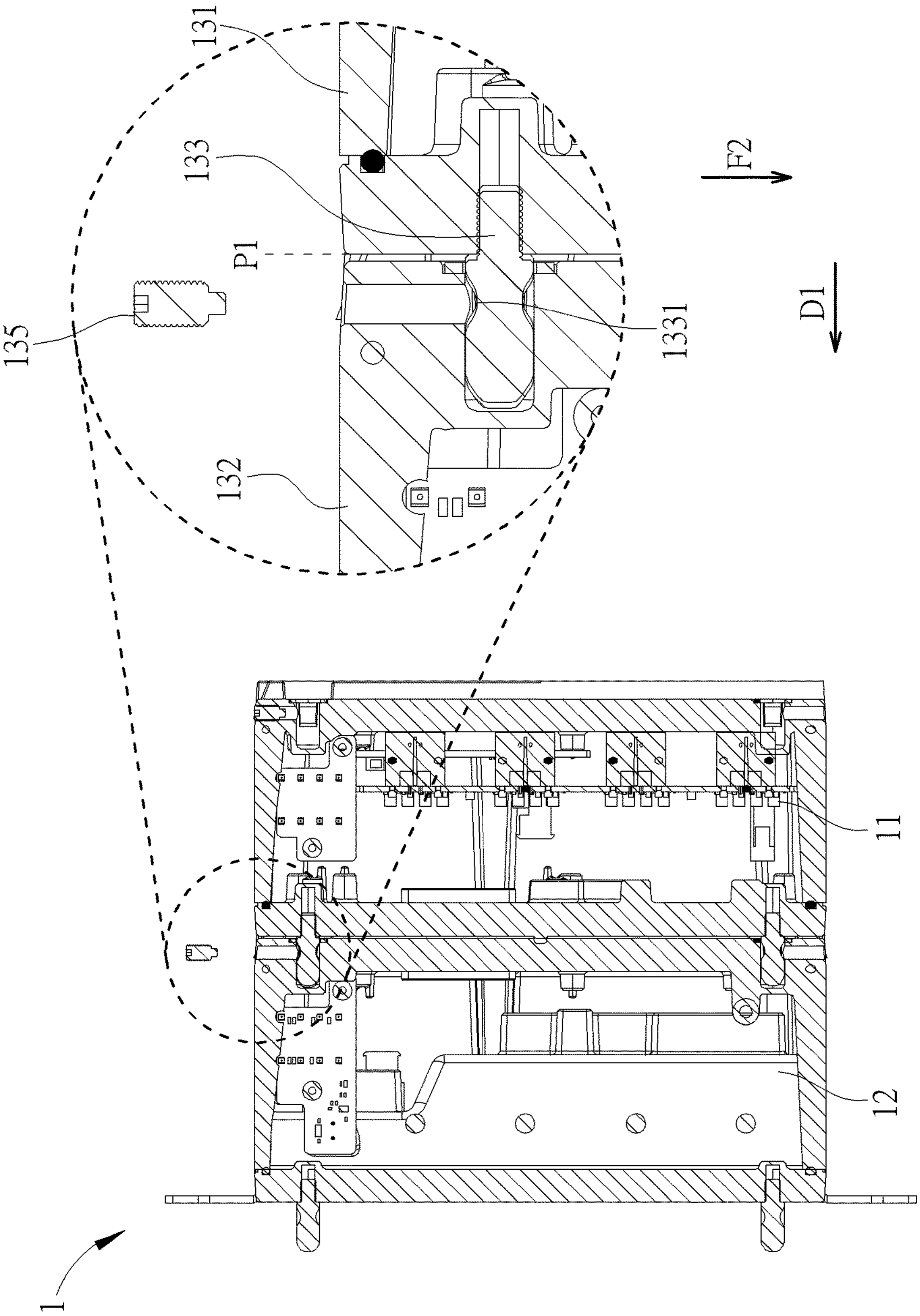
FIG. 6 and FIG. 7 are partial sectional diagrams of the electronic apparatus in the non-locked state along different lines according to the first embodiment of the present invention.
Figure 7:
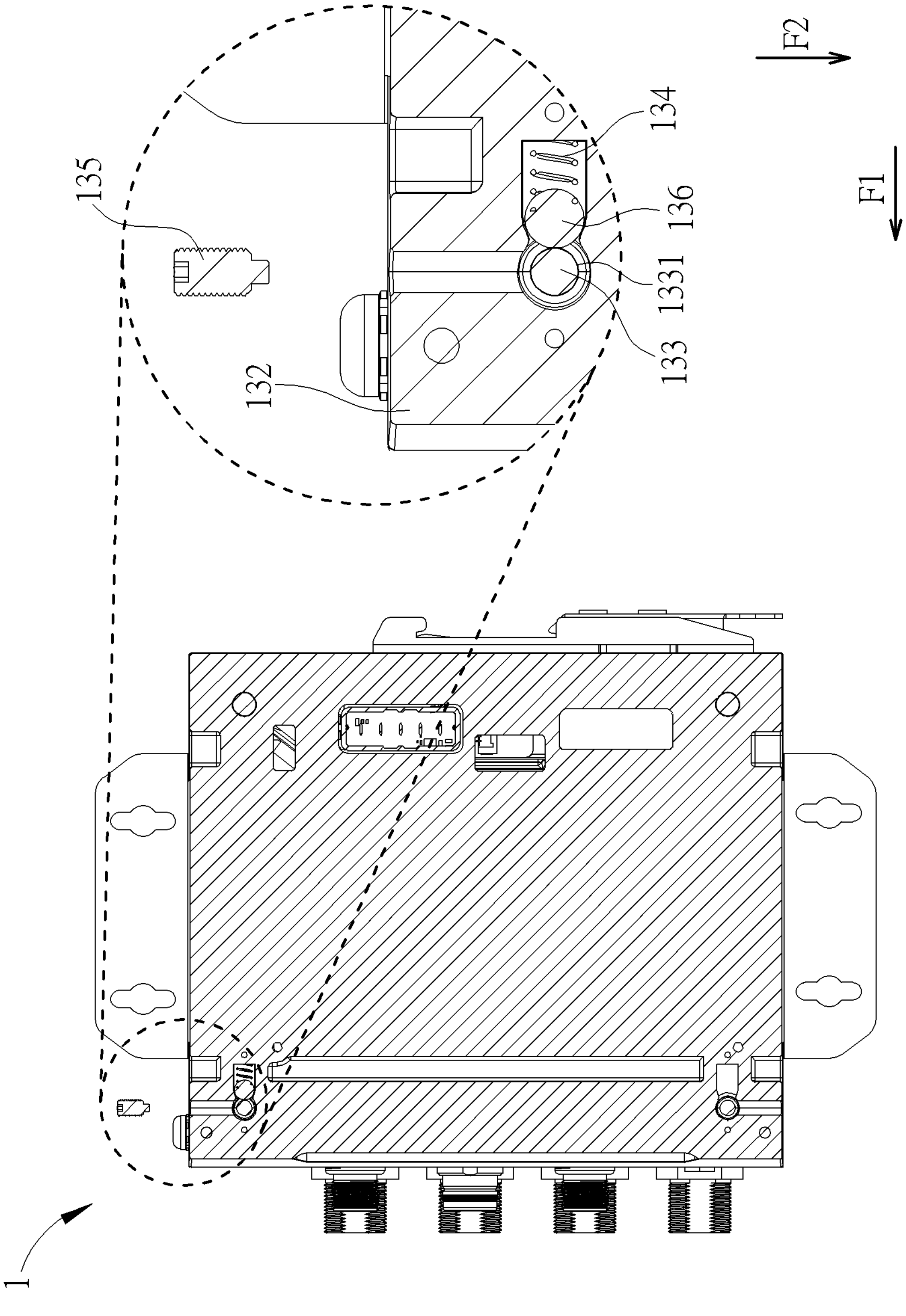
Figure 8:
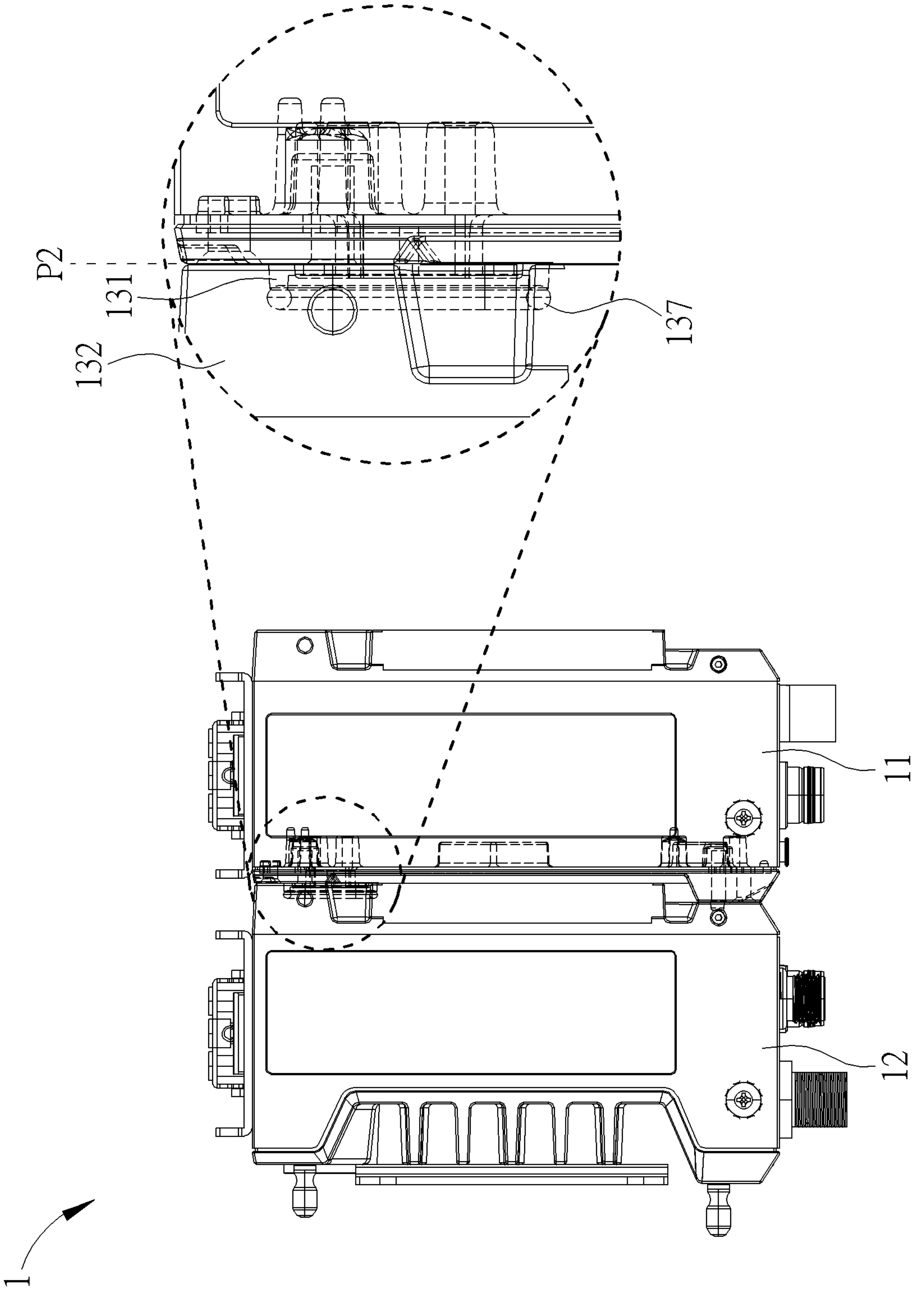
FIG. 8 is a partial diagram of the electronic apparatus in a locked state according to the first embodiment of the present invention.
Figure 9:
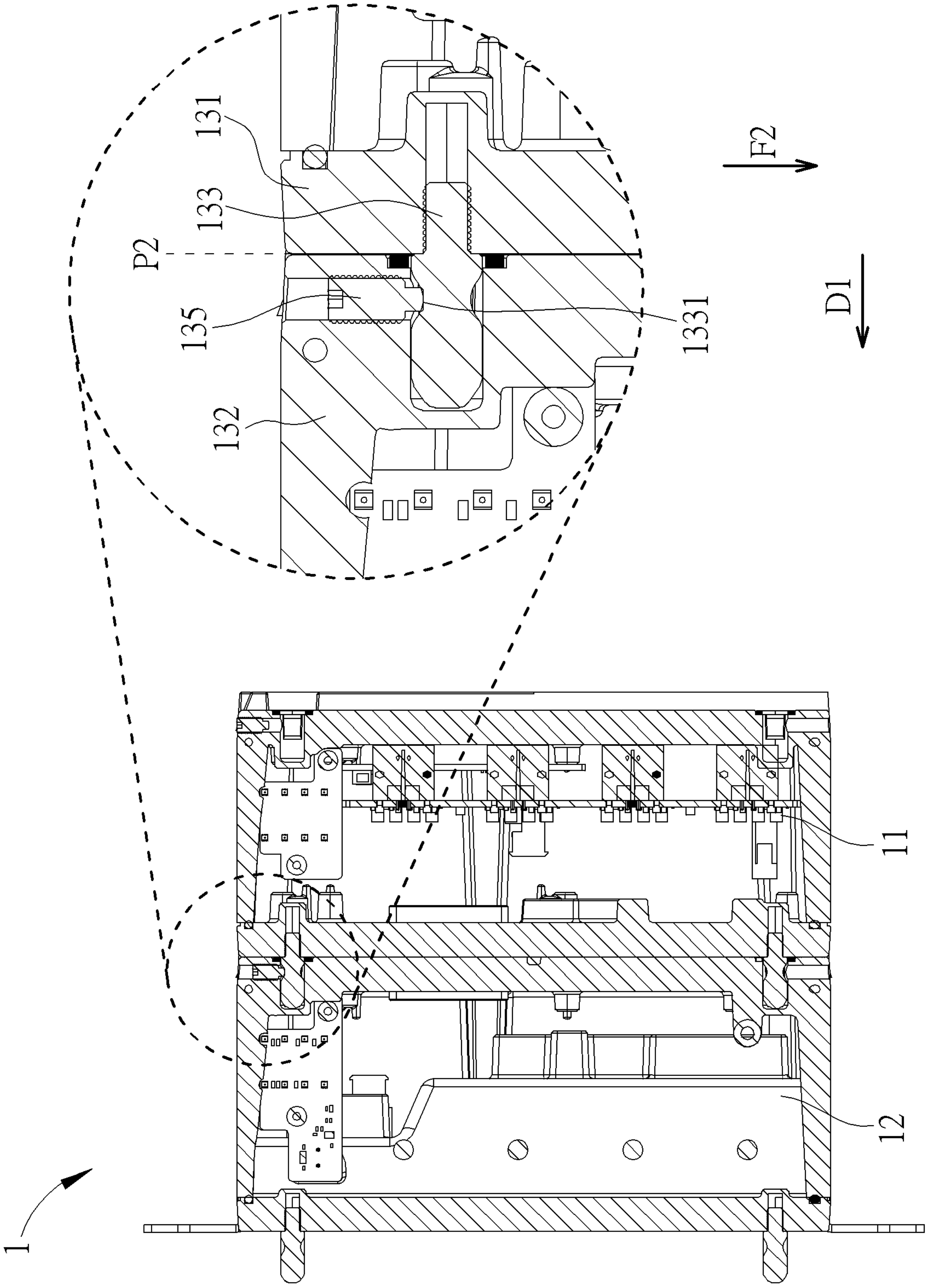
FIG. 9 and FIG. 10 are partial sectional diagrams of the electronic apparatus in the locked state along different lines according to the first embodiment of the present invention.
Figure 10:
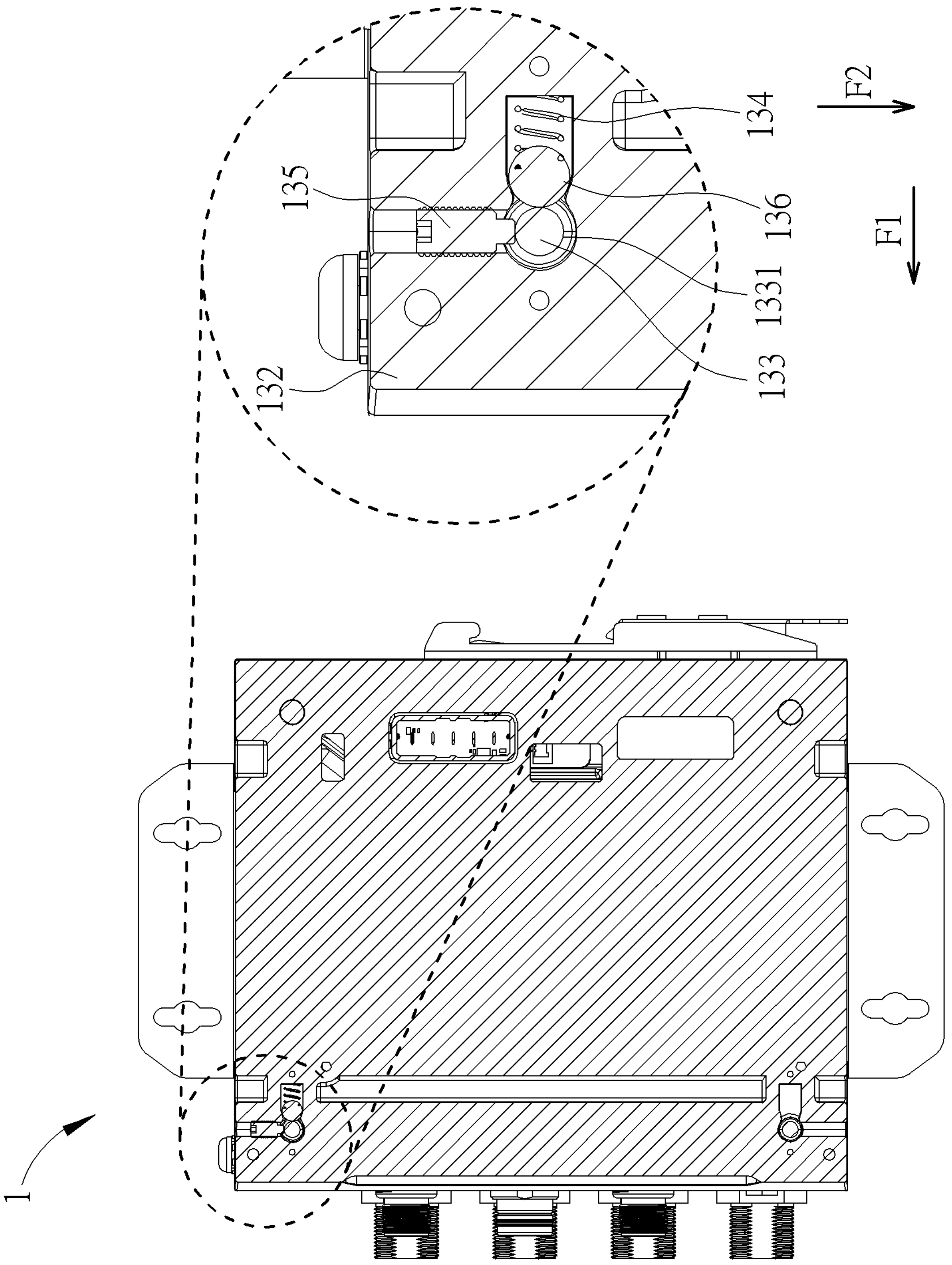

Please refer to FIG. 2 to FIG. 10. FIG. 5 is a partial diagram of the electronic apparatus 1 in a non-locked state according to the first embodiment of the present invention. FIG. 6 and FIG. 7 are partial sectional diagrams of the electronic apparatus 1 in the non-locked state along different lines according to the first embodiment of the present invention. FIG. 8 is a partial diagram of the electronic apparatus 1 in a locked state according to the first embodiment of the present invention. FIG. 9 and FIG. 10 are partial sectional diagrams of the electronic apparatus 1 in the locked state along different lines according to the first embodiment of the present invention. As shown in FIG. 2 to FIG. 4, a groove 1331 is formed on each of the pins 133 and configured to cooperate with the corresponding abutting component 136 and the corresponding locking component 135. Each of the grooves 1331 is formed on an outer periphery of the corresponding pin 133 along a circumferential direction of the corresponding pin 133. Each of the grooves 1331 is abutted by the corresponding abutting component 136 along the first forcing direction F1 and the corresponding locking component 135 along the second forcing direction F2, so as to lock the corresponding pin 133 with the radial resilient force generated by the corresponding resilient component 134 along the first forcing direction F1 and the radial locking force generated by the corresponding locking component 135 along the second forcing direction F2 perpendicular to the first forcing direction F1. Understandably, in another embodiment, there can be two different grooves configured to be abutted by the abutting component and the locking component, respectively, and the resilient component and the locking component can be configured to apply the radial resilient force and the radial locking force onto the pin along two opposite directions, respectively.

In addition, the connecting assembly 13 further includes a sealing component 137 disposed between the first connecting component 131 and the second connecting component 132. The sealing component 137 can be made of resilient material. The sealing component 137 can position the pin 133 at an initial inserting position as shown in FIG. 5 and FIG. 6 when the pin 133 is inserted to the second connecting component 132. Afterwards, when the locking component 135 is screwed onto the second connecting component 132, a cooperation of the locking component 135 and the groove 1331 can drive the pin 133 to move from the initial inserting position P1 as shown in FIG. 5 and FIG. 6 to a predetermined inserting position P2 along the first direction D1, so as to drive the first connecting component 131 to move along the first direction D1 together with the pin 133, such that the sealing component 137 is clamped and resiliently deformed by the first connecting component 131 and the second connecting component 132. The aforementioned configuration enables the first connecting component 131 and the second connecting component 132 to be connected to each other seamlessly to meet requirements of dustproof and waterproof functions for preventing moisture or particle from entering into the first electronic device 11 and/or the second electronic device 12.

In this embodiment, the sealing component 137 can be an O-shaped sealing ring surrounding an electrical connector of the first electronic device 11 and an electrical connector of the second electronic device 12. However, the present invention is not limited to this embodiment.

Understandably, in another embodiment, if there is no demand for dustproof and waterproof functions, the sealing component can be omitted. Furthermore, the pin can be configured to be located at the predetermined inserting position when being inserted into the second connecting component, and the locking component can be configured to lock the pin located at the predetermined inserting position after insertion of the pin into the second connecting component.

Figure 11:
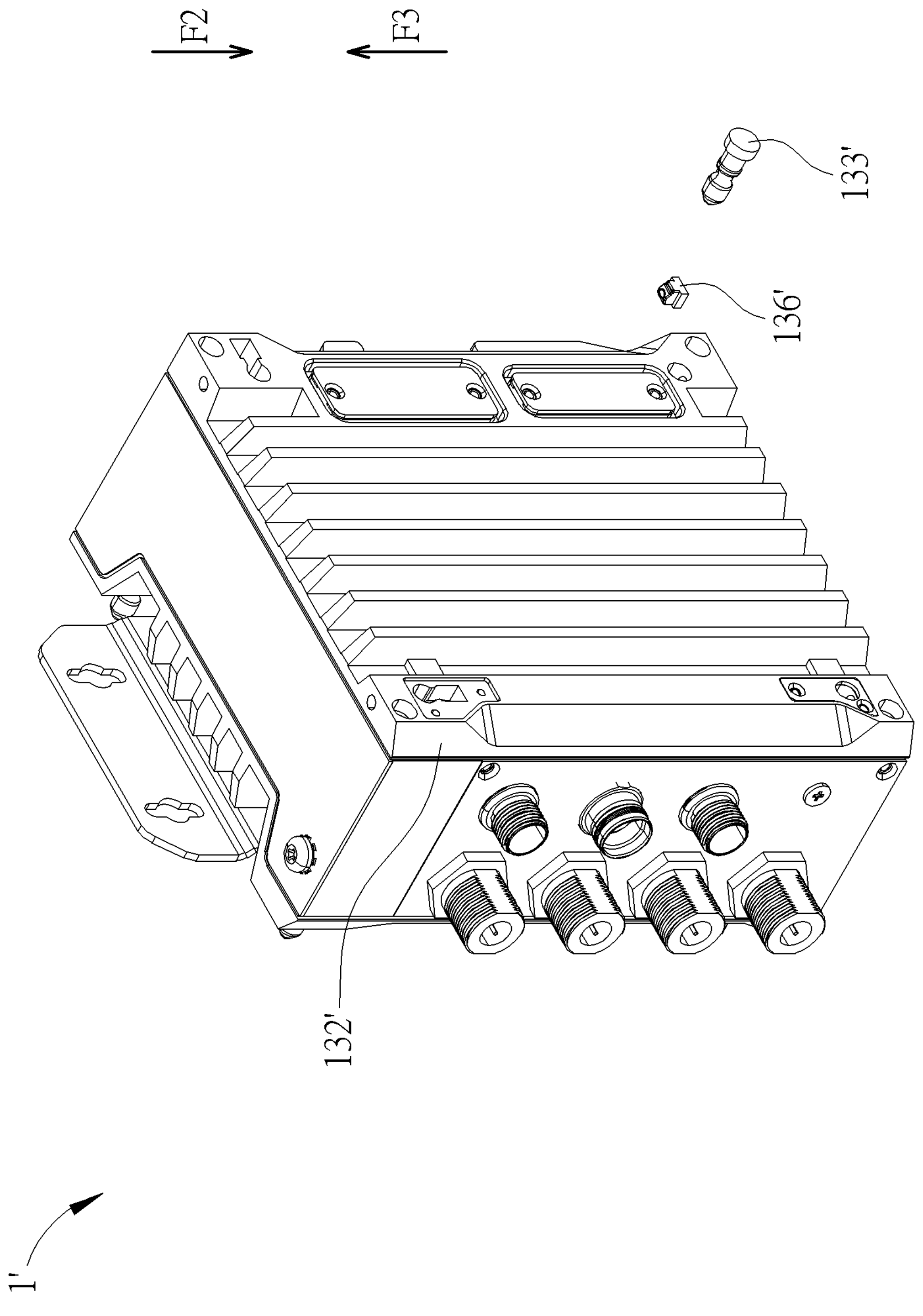
FIG. 11 is a partial exploded diagram of an electronic apparatus according to a second embodiment of the present invention.
Figure 12:
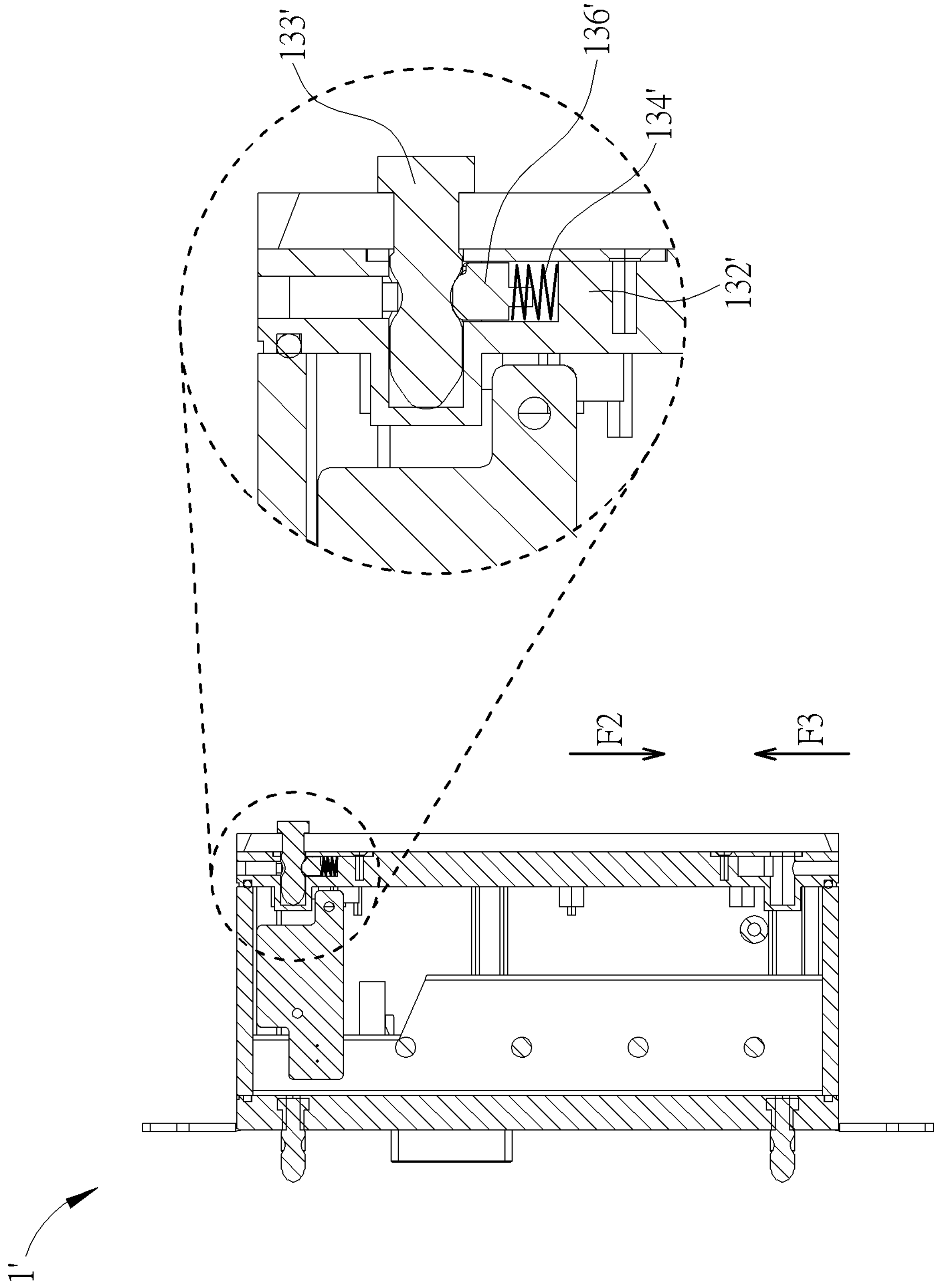
FIG. 12 is a partial sectional diagram of the electronic apparatus in a locked state according to the second embodiment of the present invention.

Please refer to FIG. 11 and FIG. 12. FIG. 11 is a partial exploded diagram of an electronic apparatus 1' according to a second embodiment of the present invention. FIG. 12 is a partial sectional diagram of the electronic apparatus 1' in a locked state according to the second embodiment of the present invention. As shown in FIG. 11 and FIG. 12, different from the first embodiment, in the second embodiment, an abutting component 136' is a protruding platform made of plastic material or resilient material, and a resilient component 134' is configured to abut against the abutting component 136' to indirectly apply a radial resilient force onto a pin 133' inserted into a second connecting component 132' along a third forcing direction F3 opposite to the second forcing direction F2 via the abutting component 136'.

Other details of the second embodiment are the same as the ones of the first embodiment. Detailed description is omitted herein for simplicity.

Figure 13:
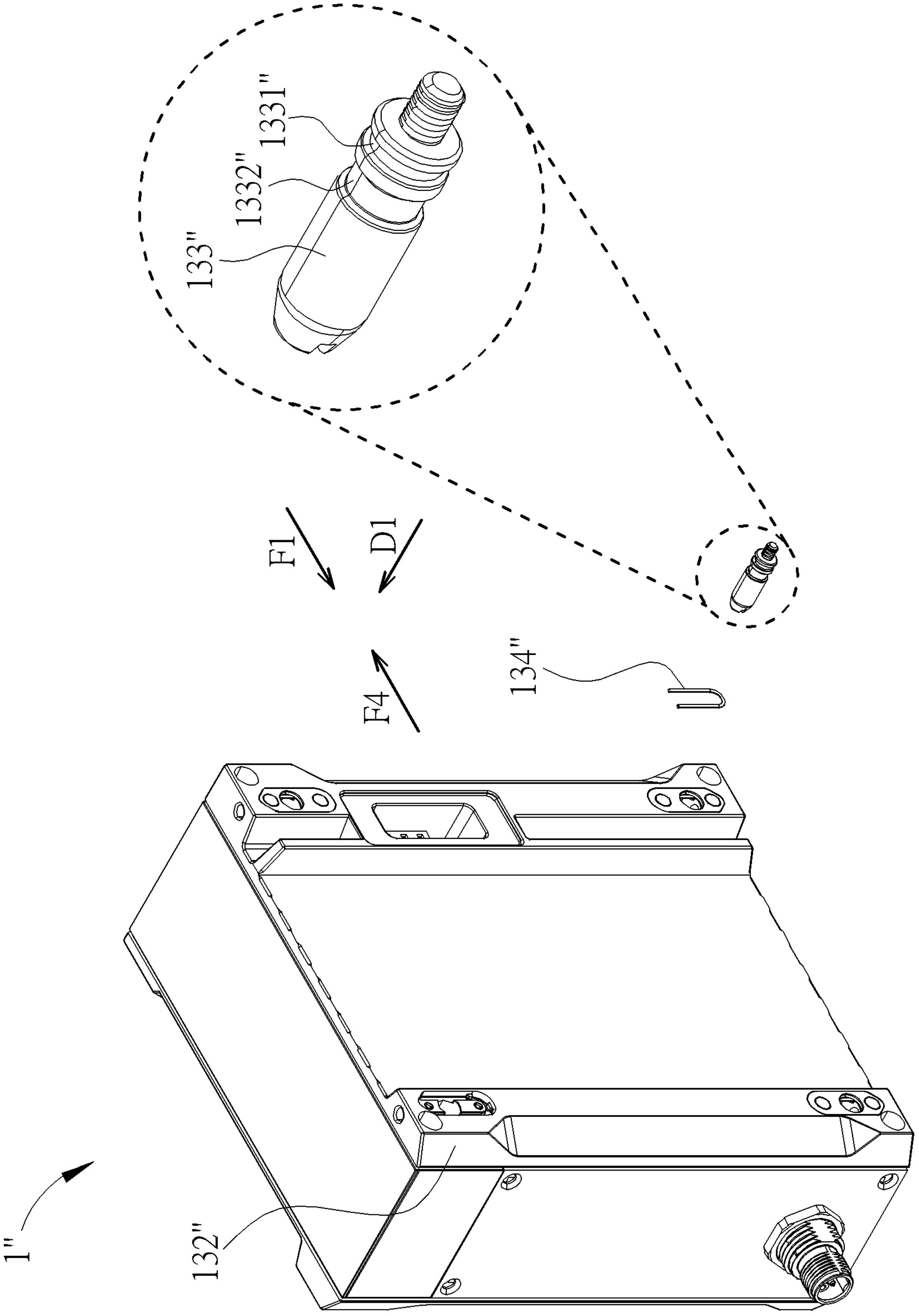
FIG. 13 is a partial exploded diagram of an electronic apparatus according to a third embodiment of the present invention.
Figure 14:
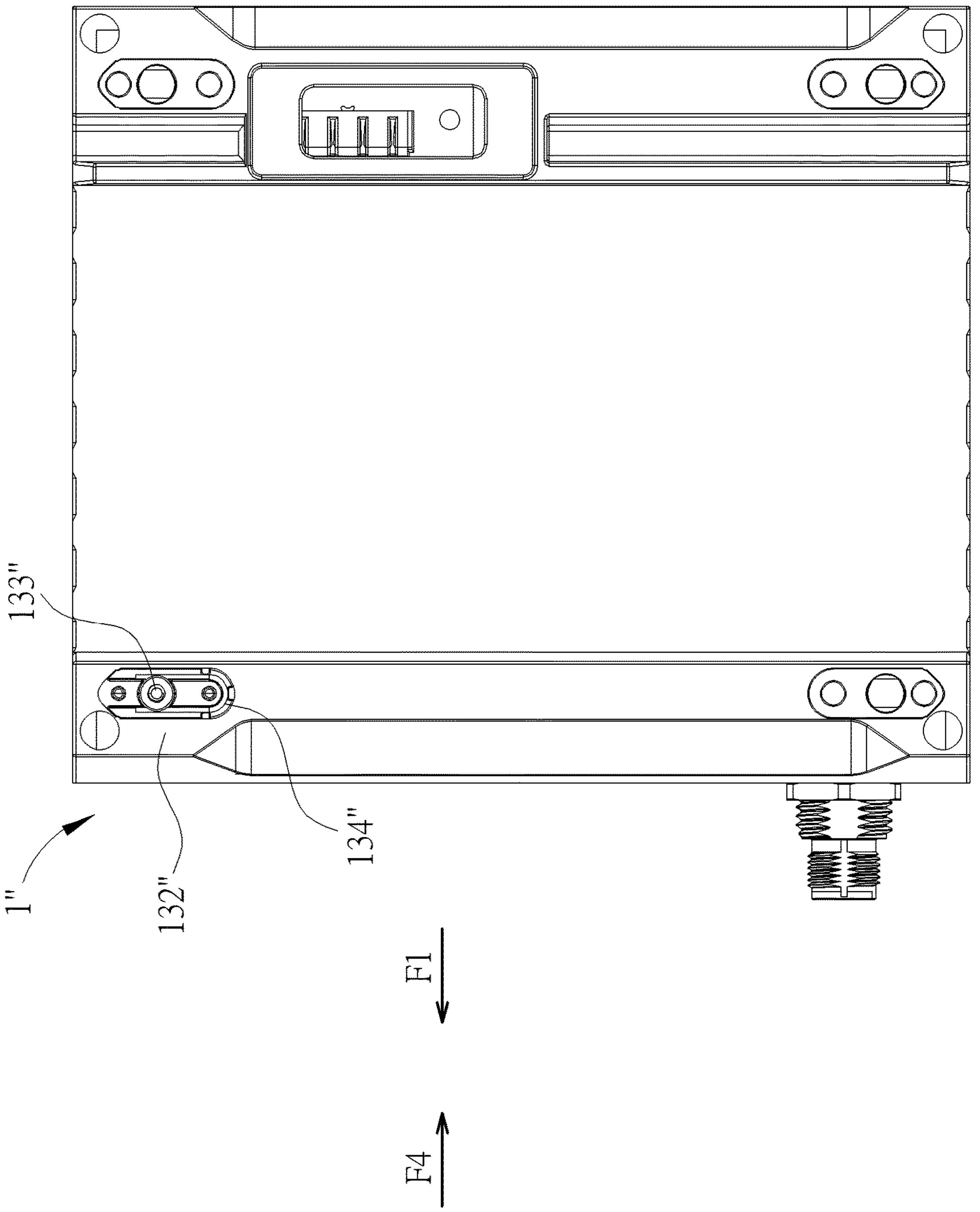
FIG. 14 is a partial diagram of the electronic apparatus in a locked state according to the third embodiment of the present invention.
Figure 15:
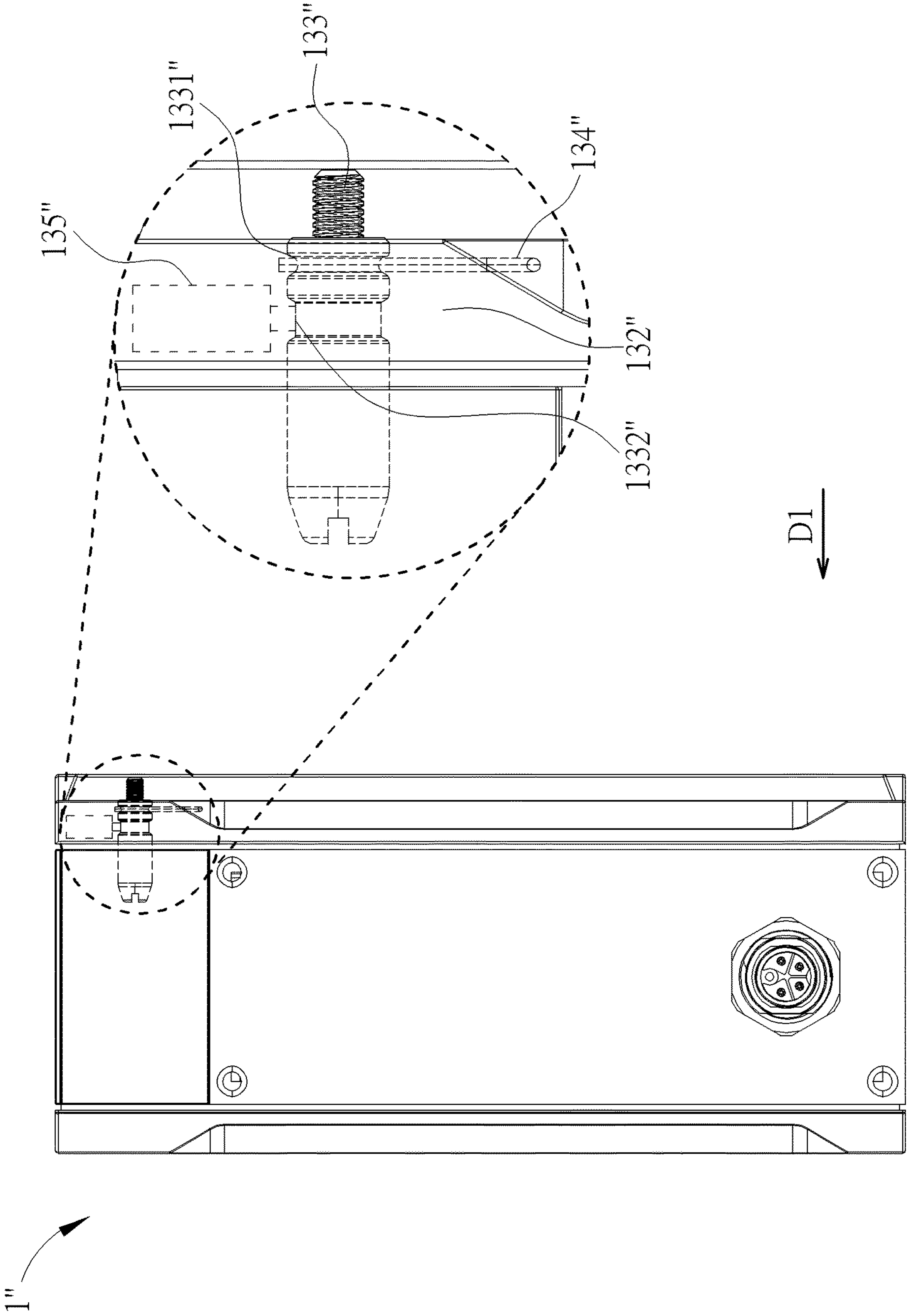
FIG. 15 is a partial sectional diagram of the electronic apparatus in the locked state according to the third embodiment of the present invention.

Please refer to FIG. 13 to FIG. 15. FIG. 13 is a partial exploded diagram of an electronic apparatus 1" according to a third embodiment of the present invention. FIG. 14 is a partial diagram of the electronic apparatus 1" in a locked state according to the third embodiment of the present invention. FIG. 15 is a partial sectional diagram of the electronic apparatus 1" in the locked state according to the third embodiment of the present invention. As shown in FIG. 13 to FIG. 15, different from the first embodiment, in the third embodiment, a resilient component 134" is configured to abut against a pin 133" to directly apply a radial resilient force onto the pin 133" along the first forcing direction F1 and a fourth forcing direction F4 opposite to the first forcing direction F1. In this embodiment, the resilient component 134" can be a U-shaped spring. However, the present invention is not limited to this embodiment. Besides, a first groove 1331" and a second groove 1332" are formed on the pin 133". The first groove 1331" is configured to cooperate with the resilient component 134" when the pin 133" is inserted into a second connecting component 132", and the second groove 1332" is configured to cooperate with a locking component 135" when the locking component 135" is screwed onto the second connecting component 132" for driving the pin 133" to move from the initial inserting position to the predetermined inserting position along the first direction D1.

Other details of the third embodiment are the same as the ones of the first embodiment. Detailed description is omitted herein for simplicity.

In contrast to the prior art, the present invention can lock the pin with the radial resilient force generated by the resilient component and the radial locking force generated by the locking component for ensuring the first electronic device and the second electronic device to be aligned and connected to each other stably and firmly when the pin is inserted into the second connecting component and the locking component is screwed onto the second connecting component. Therefore, the present: invention has advantages of simple structure and easy operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connecting assembly for aligning and connecting a first electronic device and a second electronic device, the connecting assembly comprising:

a first connecting component disposed on the first electronic device;

a second connecting component disposed on the second electronic device;

a pin protruding from the first connecting component and configured to be inserted into the second connecting component along a first direction;

a resilient component disposed inside the second connecting component and configured to apply a radial resilient force onto the pin inserted into the second connecting component; and a locking component screwed onto the second connecting component and configured to apply a radial locking force onto the pin inserted into the second connecting component.

2. The connecting assembly of claim 1, further comprising an abutting component disposed inside the second connecting component and configured to abut against the pin, and the resilient component abutting against the abutting component to indirectly apply the radial resilient force onto the pin via the abutting component.

3. The connecting assembly of claim 2, wherein a groove is formed on the pin and configured to cooperate with the abutting component and the locking component, and the groove is formed on an outer periphery of the pin along a circumferential direction.

4. The connecting assembly of claim 3, further comprising a sealing component disposed between the first connecting component and the second connecting component, and when the locking component is screwed onto the second connecting component, a cooperation of the locking component and the groove driving the pin to move from an initial inserting position to a predetermined inserting position along the first direction for driving the first connecting component to move along the first direction together with the pin, such that the sealing component is clamped and resiliently deformed by the first connecting component and the second connecting component.

5. The connecting assembly of claim 2, wherein the abutting component is a ball-shaped structure or a protruding platform structure, the locking component is a screw or a bolt, and the resilient component is a compression spring.

6. The connecting assembly of claim 1, wherein the resilient component abuts against the pin to directly apply the radial resilient force onto the pin.

7. The connecting assembly of claim 6, wherein a first groove and a second groove are formed on the pin and configured to cooperate with the resilient component and the locking component, respectively.

8. The connecting assembly of claim 7, further comprising a sealing component disposed between the first connecting component and the second connecting component, when the locking component is screwed onto the second connecting component, a cooperation of the locking component and the second groove driving the pin to move from an initial inserting position to a predetermined inserting position along the first direction for driving the first connecting component to move along the first direction together with the pin, such that the sealing component is clamped and resiliently deformed by the first connecting component and the second connecting component.

9. The connecting assembly of claim 6, wherein the resilient component is a U-shaped spring, and the locking component is a screw or a bolt.

10. The connecting assembly of claim 1, further comprising a sealing component disposed between the first connecting component and the second connecting component, when the locking component is screwed onto the second connecting component, a cooperation of the locking component and the pin driving the pin to move from an initial inserting position to a predetermined inserting position along the first direction for driving the first connecting component to move along the first direction together with the pin, such that the sealing component is clamped and resiliently deformed by the first connecting component and the second connecting component.

11. An electronic apparatus comprising:

a first electronic device;

a second electronic device detachably connected to the first electronic device; and a connecting assembly for aligning and connecting the first electronic device and the second electronic device, the connecting assembly comprising:

a first connecting component disposed on the first electronic device;

a second connecting component disposed on the second electronic device;

a pin protruding from the first connecting component and configured to be inserted into the second connecting component along a first direction;

a resilient component disposed inside the second connecting component and configured to apply a radial resilient force onto the pin inserted into the second connecting component; and a locking component screwed onto the second connecting component and configured to apply a radial locking force onto the pin inserted into the second connecting component.

12. The electronic apparatus of claim 11, wherein the connecting assembly further comprises an abutting component disposed inside the second connecting component and configured to abut against the pin, and the resilient component abuts against the abutting component to indirectly apply the radial resilient force onto the pin via the abutting component.

13. The electronic apparatus of claim 12, wherein a groove is formed on the pin and configured to cooperate with the abutting component and the locking component, and the groove is formed on an outer periphery of the pin along a circumferential direction.

14. The electronic apparatus of claim 13, wherein the connecting assembly further comprises a sealing component disposed between the first connecting component and the second connecting component, and when the locking component is screwed onto the second connecting component, a cooperation of the locking component and the groove drives the pin to move from an initial inserting position to a predetermined inserting position along the first direction for driving the first connecting component to move along the first direction together with the pin, such that the sealing component is clamped and resiliently deformed by the first connecting component and the second connecting component.

15. The electronic apparatus of claim 12, wherein the abutting component is a ball-shaped structure or a protruding platform structure, the locking component is a screw or a bolt, and the resilient component is a compression spring.

16. The electronic apparatus of claim 11, wherein the resilient component abuts against the pin to directly apply the radial resilient force onto the pin.

17. The electronic apparatus of claim 16, wherein a first groove and a second groove are formed on the pin and configured to cooperate with the resilient component and the locking component, respectively.

18. The electronic apparatus of claim 17, wherein the connecting assembly further comprises a sealing component disposed between the first connecting component and the second connecting component, when the locking component is screwed onto the second connecting component, a cooperation of the locking component and the second groove drives the pin to move from an initial inserting position to a predetermined inserting position along the first direction for driving the first connecting component to move along the first direction together with the pin, such that the sealing component is clamped and resiliently deformed by the first connecting component and the second connecting component.

19. The electronic apparatus of claim 16, wherein the resilient component is a U-shaped spring, and the locking component is a screw or a bolt.

20. The electronic apparatus of claim 11, wherein the connecting assembly further comprises a sealing component disposed between the first connecting component and the second connecting component, when the locking component is screwed onto the second connecting component, a cooperation of the locking component and the pin drives the pin to move from an initial inserting position to a predetermined inserting position along the first direction for driving the first connecting component to move along the first direction together with the pin, such that the sealing component is clamped and resiliently deformed by the first connecting component and the second connecting component.

* * * * *